US 10,668,547 B2

(12) United States Patent
Lutz et al.

(10) Patent No.: US 10,668,547 B2
(45) Date of Patent: Jun. 2, 2020

(54) SAW BLADE FOR A SAW CUTTING STALK CROPS

(71) Applicant: GEBRUEDER BUSATIS GESELLSCHAFT M.B.H., Purgstall an der Erlauf (AT)

(72) Inventors: Wolfgang Lutz, Wieselburg (AT); Thomas Riegler, Waidhofen an der Ybbs (AT)

(73) Assignee: Gebrueder Busatis Gesellschaft m.b.H., Purgstall an der Erlauf (AT)

( * ) Notice: Subject to any disclaimer, the term of this patent is extended or adjusted under 35 U.S.C. 154(b) by 0 days.

(21) Appl. No.: 15/975,161

(22) Filed: May 9, 2018

(65) Prior Publication Data

US 2018/0326516 A1 Nov. 15, 2018

(30) Foreign Application Priority Data

May 9, 2017 (AT) .............................. A 50376/2017

(51) Int. Cl.
*B23D 61/02* (2006.01)
*A01D 34/73* (2006.01)
*A01D 34/44* (2006.01)
*B22F 7/06* (2006.01)

(52) U.S. Cl.
CPC ........... *B23D 61/026* (2013.01); *A01D 34/73* (2013.01); *B23D 61/021* (2013.01); *A01D 34/44* (2013.01); *B22F 7/062* (2013.01)

(58) Field of Classification Search
CPC .... B23D 61/02; B23D 61/021; B23D 61/025; B23D 61/026; A01D 34/73
See application file for complete search history.

(56) References Cited

U.S. PATENT DOCUMENTS

| 2,259,015 A | * | 10/1941 | Anderson | ............... B27B 33/08 144/218 |
| 2,770,267 A | * | 11/1956 | Edmiston | ............ B23D 61/021 83/848 |
| 2,961,910 A | * | 11/1960 | Grassmann | .......... B23D 61/021 83/471.2 |
| 3,866,504 A | * | 2/1975 | Claesson | ................ B27B 33/02 30/355 |

(Continued)

FOREIGN PATENT DOCUMENTS

| CA | 2071627 A1 * | 12/1993 | ............ A01D 34/73 |
| CN | 104139460 A * | 11/2014 | |

(Continued)

*Primary Examiner* — Jennifer B Swinney
(74) *Attorney, Agent, or Firm* — Laurence A. Greenberg; Werner H. Stemer; Ralph E. Locher (57) ABSTRACT

A saw blade for cutting stalk crops, such as for example maize or millet, has a planar flank and a facet flank and a sawing edge with a succession of saw teeth. The saw teeth are provided with a wear protection zone, the wear resistance of which is greater than that of a material of the base body of the saw blade. The wear protection zone is respectively located on the planar flank of each saw tooth. The saw teeth in the region of the tooth face have a cutting facet, starting from the facet flank. The cutting facet is configured at a distance from the planar flank of the saw tooth to form a blunt tooth cutting edge and, in a preferred embodiment, the cutting facet and the facet flank are configured without a wear protection zone.

8 Claims, 6 Drawing Sheets

(56) References Cited

U.S. PATENT DOCUMENTS

| | | | |
|---|---|---|---|
| 5,722,225 A | 3/1998 | Wuebbels et al. | |
| 5,848,473 A * | 12/1998 | Brandenburg, Jr. | ........................ B23D 61/121 30/514 |
| 5,906,053 A | 5/1999 | Turner et al. | |
| 6,215,093 B1 | 4/2001 | Meiners et al. | |
| 9,284,848 B2 | 3/2016 | Richter | |
| 9,468,143 B2 | 10/2016 | Stark | |
| 2013/0327198 A1 * | 12/2013 | Stark | ................ A01D 34/73 83/835 |

FOREIGN PATENT DOCUMENTS

| | | | |
|---|---|---|---|
| DE | 4324411 A1 * | 2/1994 | ........... A23D 61/021 |
| DE | 19649865 C1 | 2/1998 | |
| DE | 19647561 A1 * | 5/1998 | |
| DE | 19825758 A1 | 2/1999 | |
| DE | 20020731 U1 | 3/2001 | |
| DE | 19531918 B4 | 2/2005 | |
| DE | 102007059865 A1 | 6/2009 | |
| EP | 2476864 A1 | 7/2012 | |
| EP | 2674237 A1 | 12/2013 | |
| JP | S5476238 U | 5/1979 | |
| JP | S54180130 U | 12/1979 | |
| JP | S57117940 U | 7/1982 | |
| WO | 9605931 A1 | 2/1996 | |
| WO | WO-0242029 A1 * | 5/2002 | ........... B23D 61/123 |
| WO | 2011120111 A1 | 10/2011 | |

* cited by examiner

SAW BLADE FOR A SAW CUTTING STALK CROPS

CROSS-REFERENCE TO RELATED APPLICATION

This application claims the priority, under 35 U.S.C. § 119, of Austrian patent application A 50376/2017, filed May 9, 2017; the prior application is herewith incorporated by reference in its entirety.

BACKGROUND OF THE INVENTION

Field of the Invention

The invention relates to a saw blade for a rotary mower for cutting stalk crops, such as for example maize or millet. The saw blade comprises a planar flank and a facet flank and a sawing edge with a succession of saw teeth. The saw teeth are provided with a wear protection zone, the wear resistance of which is greater than that of the material of the base body of the saw blade.

The saw blade according to the invention is preferably designed for use as a cutting element for mowing attachments for mowing stalk crops, such as for example maize or millet. Preferably, these mowing attachments are independent of the rows. These mowing attachments are provided in the front position with adjacent mowing rotors and intake drums, wherein each mowing rotor serves as a saw and the intake drums serve for transporting away the cut crops. The mowing rotors comprise in each case a support disk which is set in rotation by a drive shaft. The saw blades according to the invention are arranged on the periphery of the support disk, the saw teeth being arranged on the outer edge of said saw blades. The unit of adjacent mowing rotors is guided just above the ground and cuts off the stalk crops as closely as possible above the ground and associated intake drums convey the stalk crops further into the harvesting machine to a chopper.

The mowing rotor generally comprises three to ten segment-shaped saw blades which are replaceable in the case of wear. When sawing and harvesting, enormous quantities of material are cut in the current powerful harvesting machines, whereby increased wear also occurs on the saw blades. Thus it is an object of the present invention to design the saw blades such that the wear is as low as possible.

Since the mowing rotors are rotated at a high speed and are guided just above the ground, a further object of the invention is to keep the position of the mowing rotors stable so that they are not turned away from the ground. Furthermore, the saw teeth are intended to be self-sharpening and the teeth themselves are intended to have a wear resistance which is as high as possible.

For example, in the prior art it has been disclosed in DE 19825758 B4 to make the entire region of the teeth wear-resistant as far as the mounting portion of the saw blade, by a hard metal coating being applied. For the cutting of stalk crops it is also disclosed to arrange the hard metal coating on only one surface of the saw blade in order to ensure a self-sharpening effect. The saw teeth disclosed therein are initially configured to be blunt and only after a lengthy mowing process are self-sharpening, pointed cutting edges formed.

With rotating saw blades, it has also been known to provide facets on the periphery of saw blades in order to provide cutting edges extending to a point on the tooth face. In such known tooth configurations, for increasing the stability a hard metal coating was applied onto the facets, but this has the drawback that sharpness and cutting ability is lost once this coating is worn. In the case of contact with solid objects, such as stones, it leads to splintering of the hard metal coating, whereby only the softer material of the base body of the saw blade remains. This drawback is also intended to be avoided according to the invention.

Moreover, in the prior art, the problem occurs that the respectively adjacent mowing rotors are rotated in opposing directions. Thus two designs of the saw blades have to be produced and inserted, namely a left-hand and a right-hand design. This increases the costs and is to be avoided.

BRIEF SUMMARY OF THE INVENTION

It is accordingly an object of the invention to provide a saw blade for cutting stalk crops which overcomes a variety of disadvantages associated with the heretofore-known devices and methods of this general type.

With the foregoing and other objects in view there is provided, in accordance with the invention, a saw blade for a saw for cutting stalk crops, the saw blade comprising:
 a base body formed with a planar flank and a facet flank;
 a sawing edge with a multiplicity of successively disposed saw teeth each having a wear protection zone formed on said planar flank thereof;
 said wear protection zone having a wear resistance that is greater than a wear resistance of a material of said base body of the saw blade;
 each saw tooth having a tooth face formed with a cutting facet starting from said facet flank; and
 each said cutting facet being formed at a spacing distance from said planar flank of each said saw tooth to form a blunt tooth cutting edge.

In other words, the present invention is characterized primarily in that the wear protection zone is respectively applied to the planar flank of each saw tooth, in that the saw teeth in the region of the tooth face have a cutting facet, starting from the facet flank, in that the cutting facet is configured at a distance from the planar flank of the saw tooth and is configured to form a blunt tooth cutting edge, and in that preferably the cutting facet and the facet flank are configured without a wear protection zone.

Preferably, the wear protection zone is arranged on the planar flank of the saw tooth extending from the tooth tip to the tooth root or in the vicinity thereof. Advantageously, the wear protection zone is produced by means of a high energy beam method.

In one variant, the successive saw teeth are arranged with their planar flank and the opposing facet flank alternately on the lower and the upper face of the saw blade.

The tooth tips of the saw teeth may be located tangentially to the sawing line of the saw blade. The tooth tips of the saw teeth may have a clearance angle of 0° to 50° relative to the sawing line.

In a further variant, the clearance angle may be 0° and the cutting angle may be 90°.

In each case the tooth tips of the successive saw teeth of the sawing edge may be arranged at an oblique angle to the longitudinal central plane of the saw blade.

Other features which are considered as characteristic for the invention are set forth in the appended claims.

Although the invention is illustrated and described herein as embodied in a saw blade for a saw for cutting stalk crops, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

DETAILED DESCRIPTION OF THE INVENTION

Figure 1:
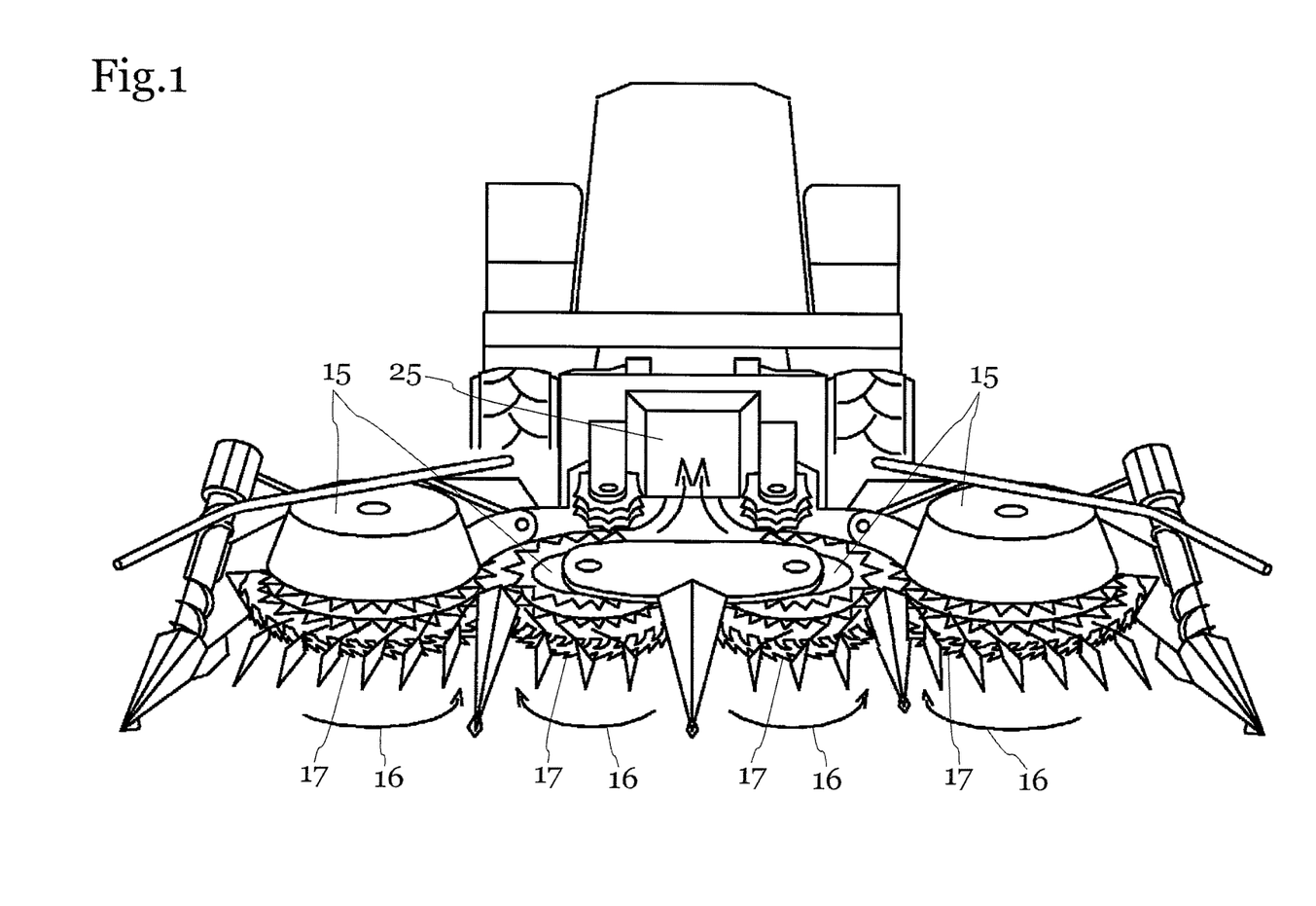
FIG. 1 shows the front view of a mowing machine in which, amongst other things, the subject of the invention may be used.

Referring now to the figures of the drawing in detail and first, particularly, to FIG. 1 thereof, there is shown a prior art arrangement of a mowing machine which serves for mowing and preferably also for chopping harvested stalk crops. The mowed crops, not shown, are cut off by the mowing rotors 17 which rotate about substantially vertical axes just above the ground and are supplied via the intake drums 15 into the intake chute 25 to the chopper or for further processing. The intake drums 15 and the mowing rotors 17 are generally located in pairs adjacent one another and in each case one pair has opposing rotational directions 16. The intake drums 15 are provided on the surface facing the ground with the mowing rotor 17 which on its periphery is provided with a saw blade 1 according to the invention. Different designs and functions of such mowing machines are disclosed in detail in the literature, such as for example in German patent No. DE 195 31 918 B4.

Figure 2:
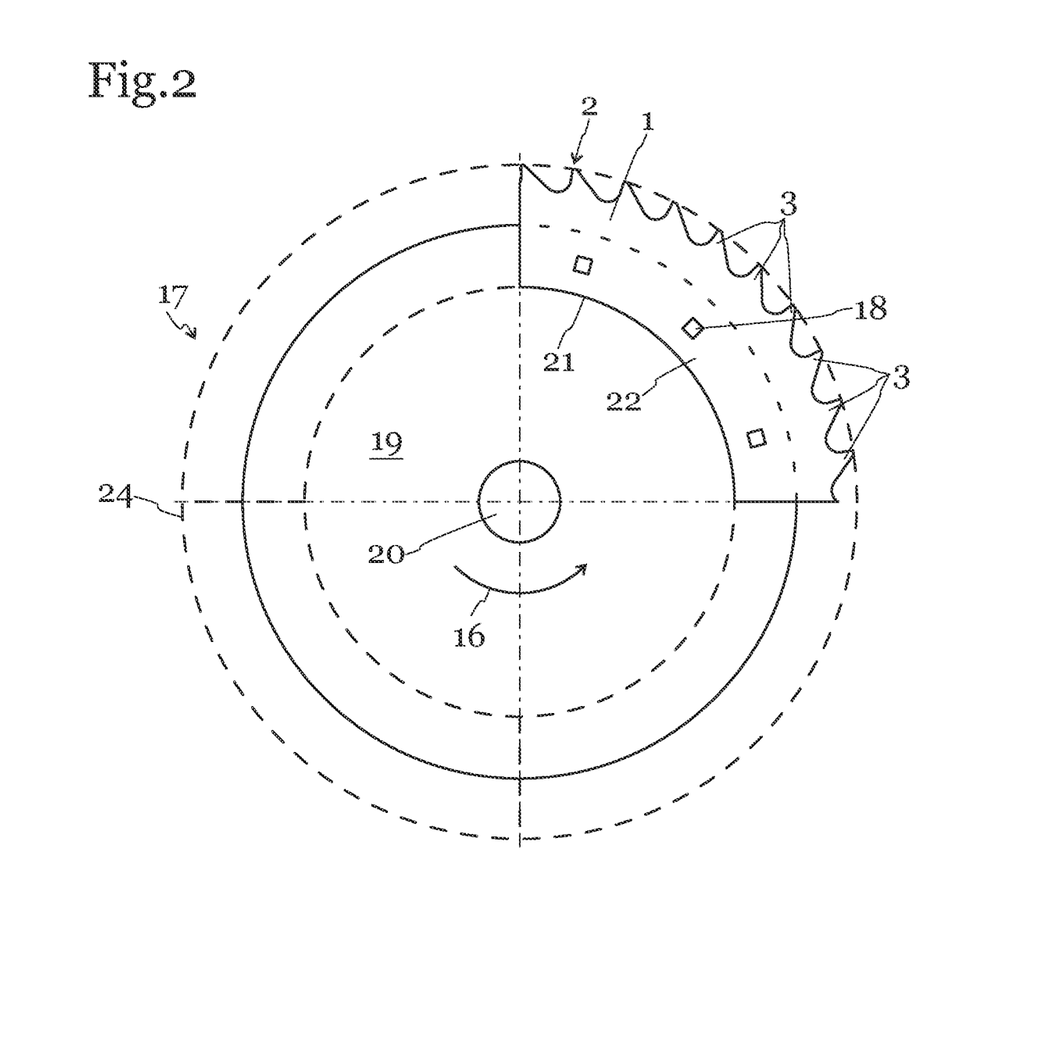
FIG. 2 shows a plan view of the mowing rotor with a saw blade.

FIG. 2 shows the plan view of the mowing rotor 17 which is provided with a saw blade 1. The completed mowing rotor 17, for example, has four such saw blades 1 so that the entire periphery of the mowing rotor 17 is filled with saw blades 1.

The saw blades 1 are fastened by means of screws, via fastening recesses 18, on the support disk 19 which may be rotated by means of a central drive shaft 20 in the rotational direction 16. The sawing edge 2 surrounds the outer edge of the saw blade 1 and is formed by the points of the saw teeth 3. The sawing edge also produces the sawing line 24 in the cut crops. The mounting portion 22 of the saw blade 1 which bears against the support disk 19 extends from the saw blade rear portion 21.

Figure 3:
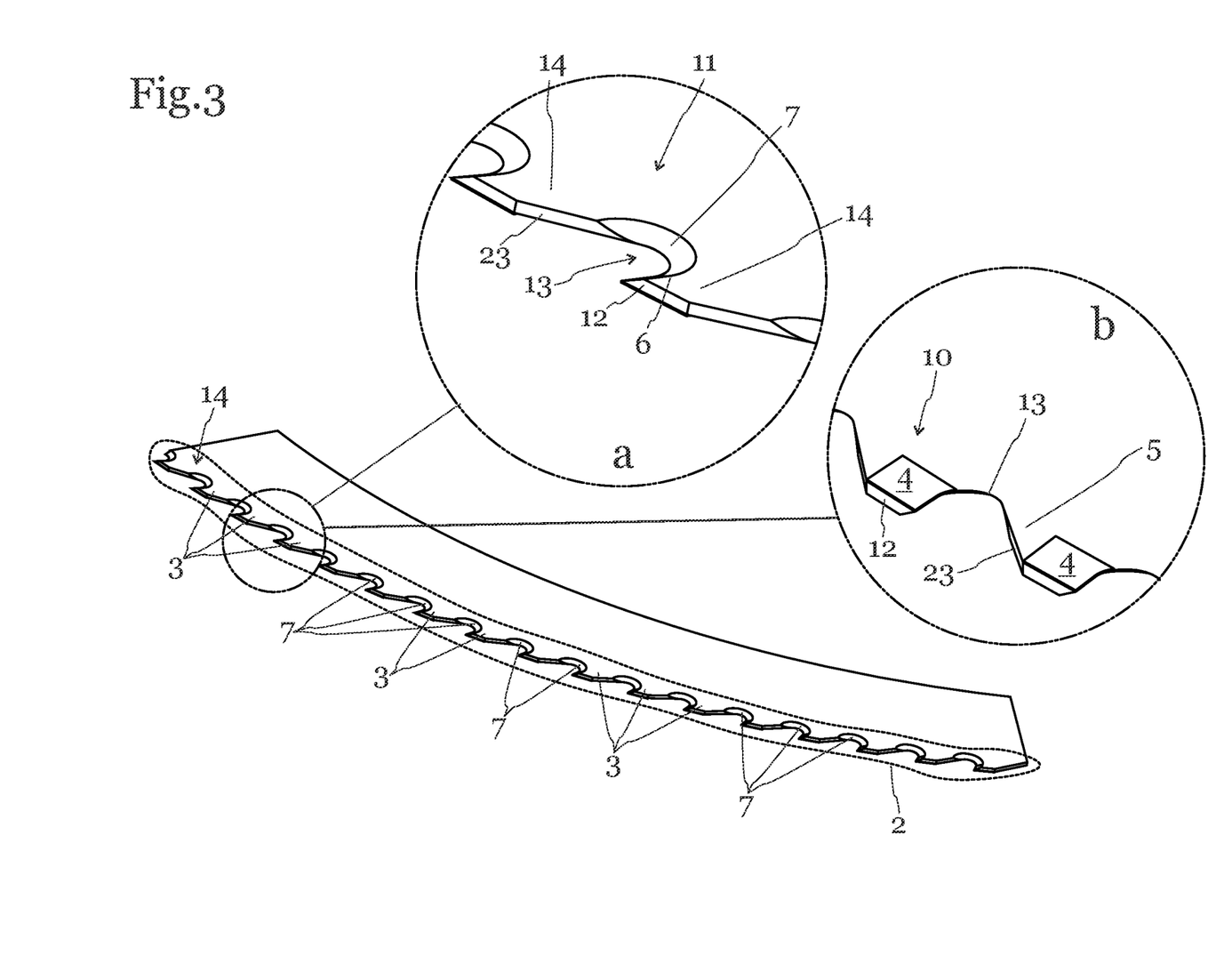
FIG. 3 shows a schematic oblique view of an embodiment of the saw blade according to the invention with two enlarged detailed views.

FIG. 3 shows an embodiment of the saw blade 1 in an oblique view and in two enlarged detail views (a, b).

In this embodiment, all of the saw teeth 3 on an upper face 11 of the saw blade 1, which hereinafter is called the facet flank 14, are provided with the cutting facets 7.

In the enlarged view a of FIG. 3, it may be seen that the cutting facet 7 extends upwardly from the tooth root 13 via the tooth face 6 as far as the tooth tip 12.

The enlarged view b of FIG. 3 shows the other lower face 10 of the saw blade 1 which is of planar design and is denoted as the planar flank 5. The wear protection zone 4 is attached to each saw tooth 3 on the planar flank 5. The wear protection zone 4 extends on one side to the edge which is formed by the cutting facet 7 on the other side of the saw blade 1. The wear protection zone 4 extends from the cutting facet 7 along the tooth rear 12 in the direction of the tooth rear 23. With this arrangement, it is fully ensured that the wear resistance of the tooth and the self-sharpening effect is maintained over the entire service life of the saw blade 1. This means a saving of surplus hard metal coating, as is otherwise known from the prior art.

Figure 4:
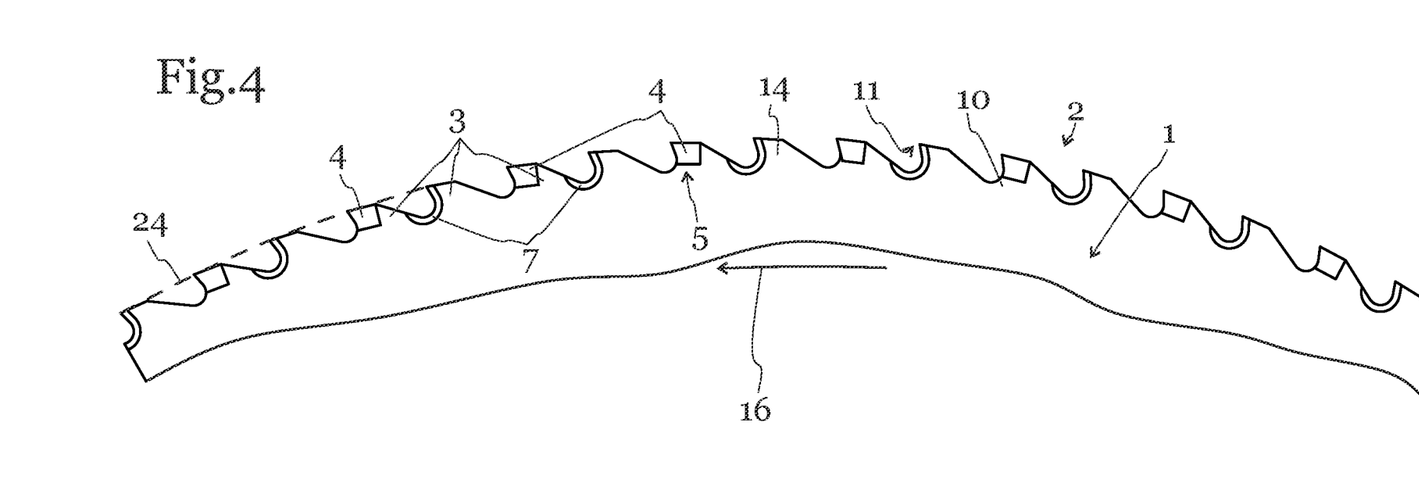
FIG. 4 shows a cut-away view of an embodiment of the saw blade.

FIG. 4 shows a further embodiment of the saw blade 1. In contrast with the previous embodiment according to FIG. 3, in this embodiment according to FIG. 4, the successive saw teeth 3 are differently designed in each case, so that one saw tooth 3 on the upper face 11 of the saw blade 1 shown has the wear protection zone 4, whilst the subsequent saw tooth 3 on the upper face 11 is provided with the cutting facet 7 and the associated wear protection zone 4 is arranged on the other, not shown, lower face 10 of the saw blade 1. Similarly, in each case the planar flank 5 follows the facet flank 14, said flanks being respectively located alternately on the lower face 10 and on the upper face 11 of the saw blade 1.

The advantage of this alternate arrangement of the planar flank and the facet flank is in the symmetry of the saw blade, whereby all mowing rotors may be provided with the same saw blades. As may be derived from FIG. 1, the mowing rotors 17 of each pair are moved in opposing rotational directions. For this reason, there are "left-hand" and "right-hand" rotors and sawblades which are different from one another. In the present embodiment according to FIG. 4, a single design suffices so that the production is simplified and the storage is also simplified and reduced in cost. Moreover, incorrect mounting is prevented.

Figure 5:
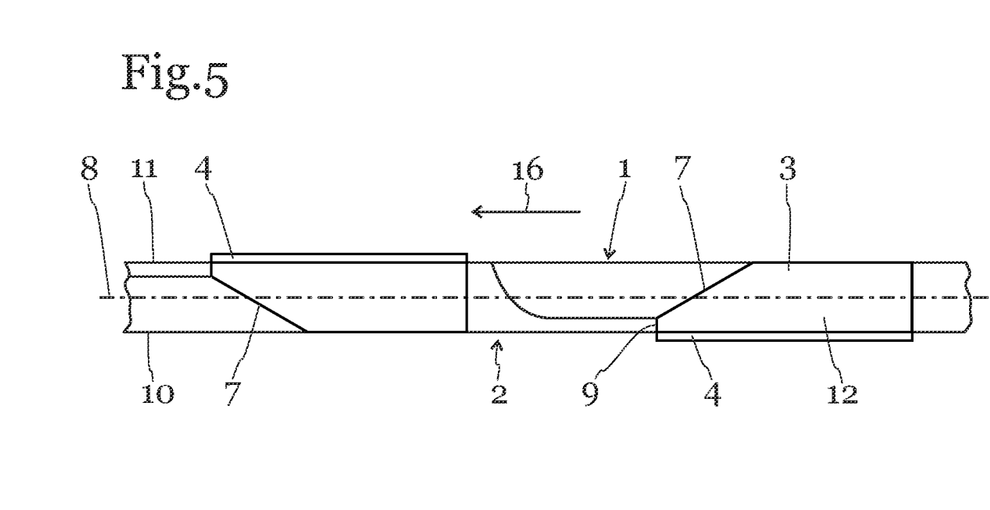
FIG. 5 shows a plan view of a sawing edge in a cut-away state.

FIG. 5 shows the schematic view of the sawing edge 2 of the saw blade 1 according to FIG. 4. The saw blade 1 substantially comprises the plate-shaped base body, the cutting teeth 3 being machined out of the periphery thereof. The cutting facets 7 in this embodiment are configured alternately on the different sides and at the tooth tip 12 lead into a tooth cutting edge 9. This means that the cutting facets 7 are not designed over the entire thickness of the saw blade 1 but a blunt part remains as the tooth cutting edge 9. This tooth cutting edge 9 with its blunt design is perfectly sufficient for cutting the cut crops at the given cutting speed and provides wear material, whereby the service life of the saw blade 1 is increased. Only when the tooth cutting edge 9 consisting of the material of the saw blade 1 is worn does the self-sharpening effect come into force by the wear protection zones 4 arranged on the different sides.

The position of the longitudinal central plane 8 of the saw blade 1 is illustrated in FIG. 5. The tooth cutting edge 9 may also extend as far as the longitudinal central plane 8 and beyond.

In the variant according to FIG. 4, the sawing line 24 is formed by all of the points of the tooth tips 12. The tooth tips 12 have a clearance angle of >1 to 50°.

Figure 6:
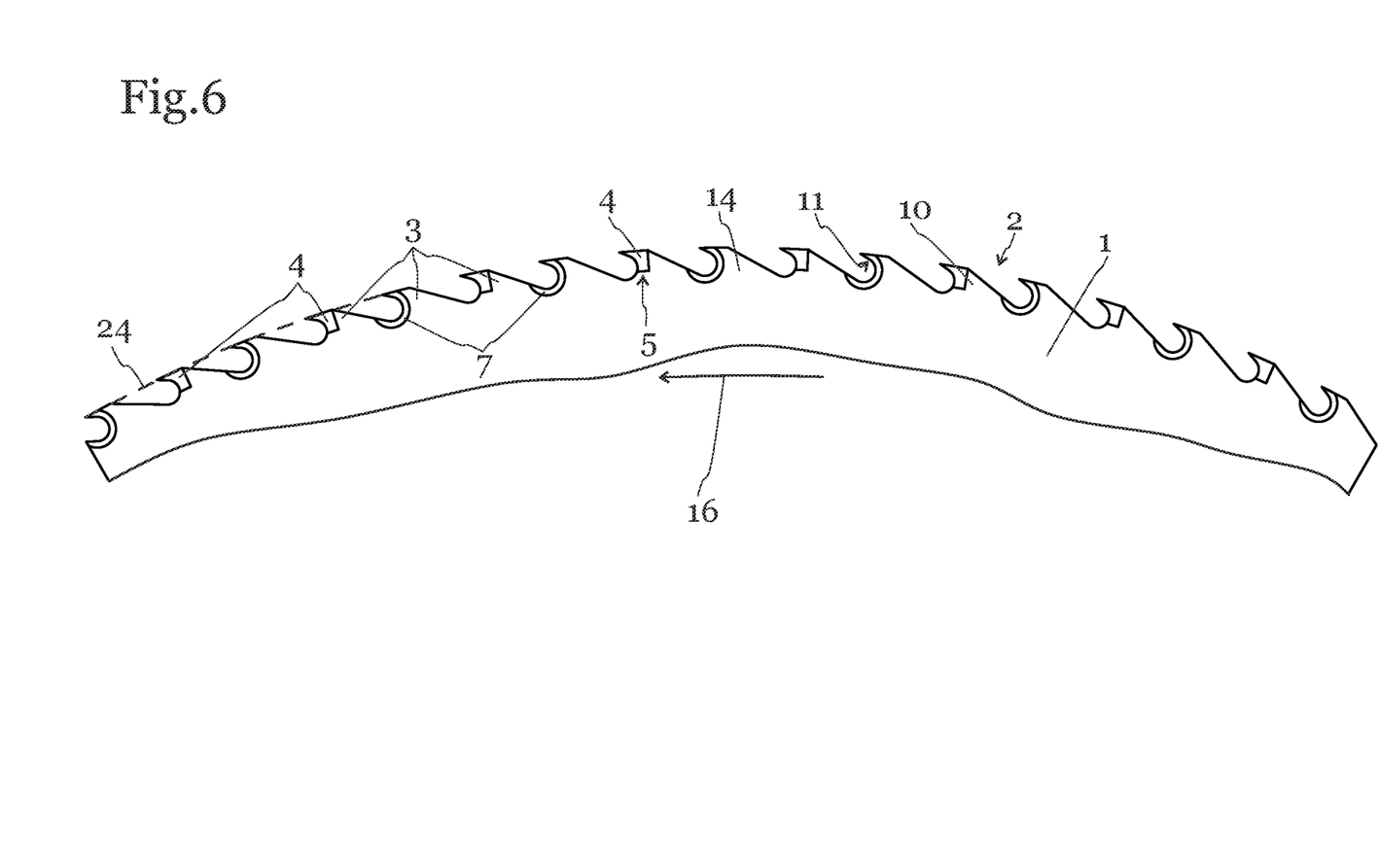
FIGS. 6 and 7 show views of further embodiments of the saw blade.

The embodiment according to FIG. 6 is substantially of the same configuration as the embodiment according to FIG. 4. Also in this case, the successive saw teeth 3 are alternately arranged with their planar flank 5 and the opposing facet flank 14 on the lower side 10 and the upper side 11, i.e. on the planar flanks 5 and facet flanks 14. In contrast to the embodiment according to FIG. 4, in the embodiment according to FIG. 6 each tooth tip 12 extending with the sawing line 24 and the teeth and/or the tooth cutting edges 9 thereof are pulled further forward in the rotational direction 16.

Figure 7:
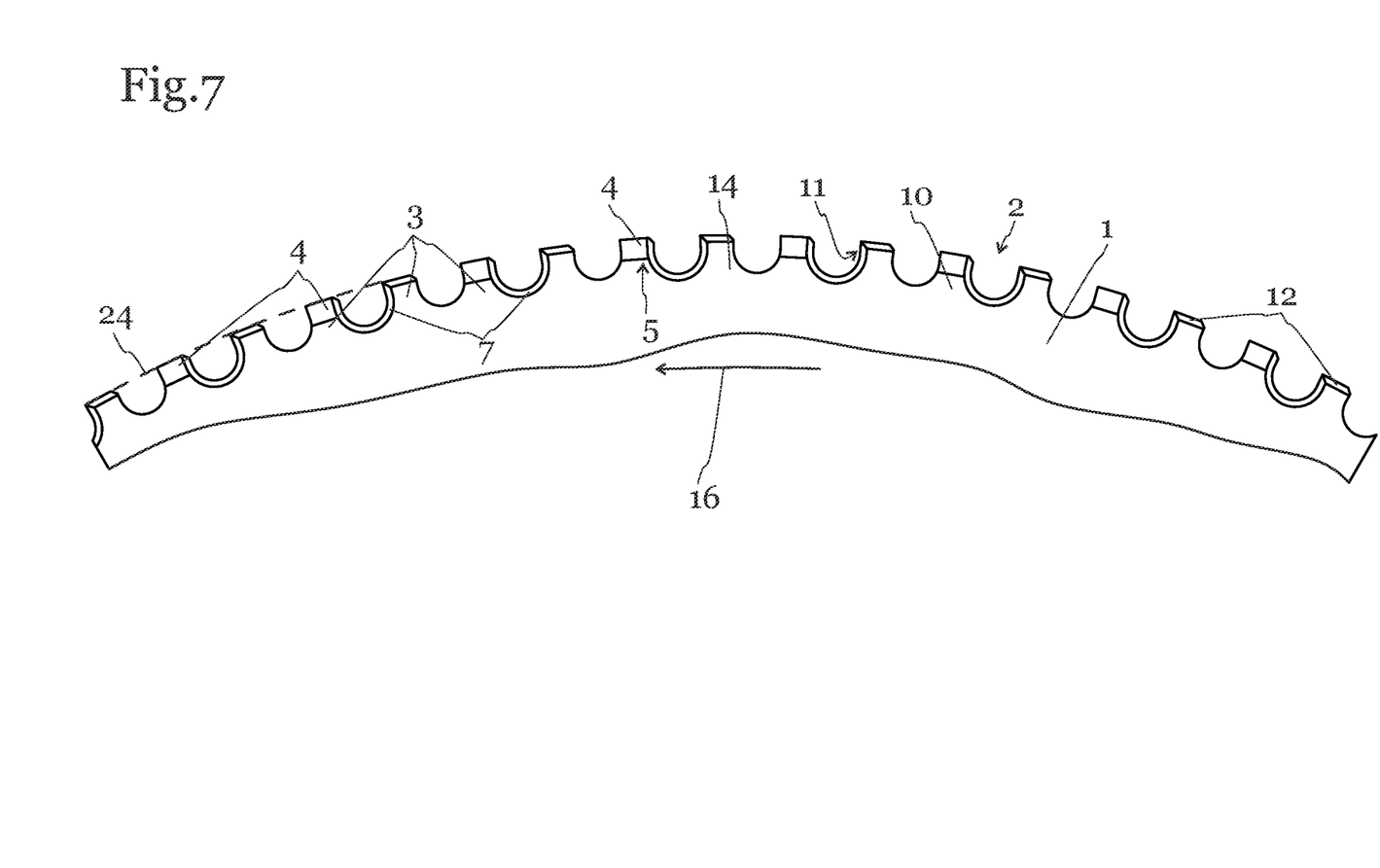

The variant according to FIG. 7 differs from the previous embodiments in that in each saw tooth the clearance angle is 0° and the cutting angle is 90°. Also in this case, the cutting facet 7 and the wear protection zone 4 are respectively located alternately on the other sides. The tooth tips 12 of the successive saw teeth 3 of the sawing edge 2 are arranged at an oblique angle to the longitudinal central plane 8 of the saw blade 1, whereby an overlapping action is provided along the edge.

The high energy beam methods preferred for increasing the wear resistance are characterized by a high energy density, so that when producing the wear protection zone a short period of exposure to the high energy beam is sufficient and the material of the base body is only affected on the surface and/or in regions very close to the surface up to approximately 1 mm. In particular with a prehardened material of the base body, the high energy beam method results in only a small reduction in hardness in the region of the heat-affected zone. If the material of the base body is not hardened, the small penetration depth leads to rapid cooling and thus to the increased hardening of the material of the base body and thus to a supporting action for the wear protection zone. High energy beam methods are sufficiently disclosed in the literature. For example, reference is had to German published application DE 10 2007 059 865 A1, to German patent DE 196 49 865 C1 and to European patent application EP 2 476 864 A1. These prior art documents are incorporated by reference.

By the high energy beam method a wear protection zone is produced which leads to a considerable lengthening of the service life, wherein by the high energy beam method the shape of the teeth is no longer substantially altered. By this machining in the vicinity of the end contour, the tooth edges may be easily obtained and post-machining is not required.

Advantageously, the wear protection zone has a wear resistance which is at least 10% greater and preferably at least 25% greater than the wear resistance of the material of the base body. In this case, the wear resistance and/or the abrasive wear resistance may be determined, for example, via the friction wheel method according to the ASTM G65 standard.

The wear protection zone may be produced by structural transformation of the material of the base body in a hardening method or remelting method by means of a high energy beam. In these methods, the material of the base body itself is altered in the region in the vicinity of the surface by the high energy beam without the addition of material, and thus the wear resistance is increased.

Alternatively, the wear protection zone may be produced by a coating method, build-up welding method, dispersion method, alloying method or melting method by means of a high energy beam. By these methods, additional material is applied and/or incorporated onto and/or into the surface of the base body.

Since with the high energy beam method the energy input into the material of the base body is carried out only in the regions very close to the surface up to approximately 1 mm and the optionally applied material thickness is very small, namely 0.05 to a maximum of 0.8 mm, preferably 0.1 to 0.4 mm, particularly preferably 0.2 to 0.3 mm, it does not result in a substantial alteration to the shape of the teeth.

Preferably, the wear protection zone is a hard material coating applied by a build-up welding method.

In this case, the hard material coating applied by a build-up welding method advantageously contains hard material particles having a size of between 40 and 250 μm embedded in a matrix material, wherein the matrix material preferably contains nickel, cobalt or a nickel-chrome-silicon composite and the hard material particles preferably contain carbide, nitride or oxide, particularly preferably tungsten carbide.

The following is a summary list of reference numerals and the corresponding structure used in the above description of the invention:

1 Saw blade
2 Sawing edge
3 Saw tooth
4 Wear protection zone
5 Planar flank
6 Tooth face
7 Cutting facet
8 Longitudinal central plane
9 Tooth cutting edge
10 Lower face of saw blade
11 Upper face of saw blade
12 Tooth tip
13 Tooth root
14 Facet flank
15 Intake drums
16 Rotational direction
17 Mowing rotor
18 Fastening recesses
19 Support disk
20 Drive shaft
21 Saw blade rear
22 Mounting portion
23 Tooth rear
24 Sawing line
25 Intake chute

The invention claimed is:

1. A saw blade for a saw for cutting stalk crops, the saw blade comprising:
 a base body having a planar flank and an opposite facet flank,
 a sawing edge with a multiplicity of successively disposed saw teeth each having a wear protection zone disposed on said planar flank thereof;
 said wear protection zone having a wear resistance that is greater than a wear resistance of a material of said base body of the saw blade;
 each saw tooth having a cutting facet on said facet flank extending toward a tooth tip from a tooth root; and
 each said cutting facet having a blunt tooth cutting edge;
 said cutting facet and said facet flank being configured without a wear protection zone;
 said wear protection zone disposed on said planar flank of said saw tooth extending from said tooth tip and terminating at said tooth root.

2. The saw blade according to claim 1, wherein said wear protection zone is a zone produced by a high energy beam method.

3. The saw blade according to claim 1, wherein said successively disposed saw teeth are alternately arranged on a lower face of said planar flank and an upper face of said opposing facet flank.

4. The saw blade according to claim 1, wherein said saw teeth have tooth tips disposed tangentially to a sawing edge of the saw blade.

5. The saw blade according to claim 1, wherein said saw teeth have tooth tips with a clearance angle of greater than 0 to 50° relative to a sawing edge of the saw blade.

6. The saw blade according to claim 5, wherein the clearance angle is 0° and a cutting angle is 90°.

7. The saw blade according to claim 6, wherein each of said tooth tips of said successively disposed saw teeth of said sawing edge are arranged at an oblique angle to a longitudinal central plane of the saw blade.

8. The saw blade according to claim 1 configured for cutting maize or millet.

* * * * *